H. S. BARNWELL.
CLUTCH OPERATING MECHANISM.
APPLICATION FILED MAR. 18, 1913.
1,108,669.
Patented Aug. 25, 1914.
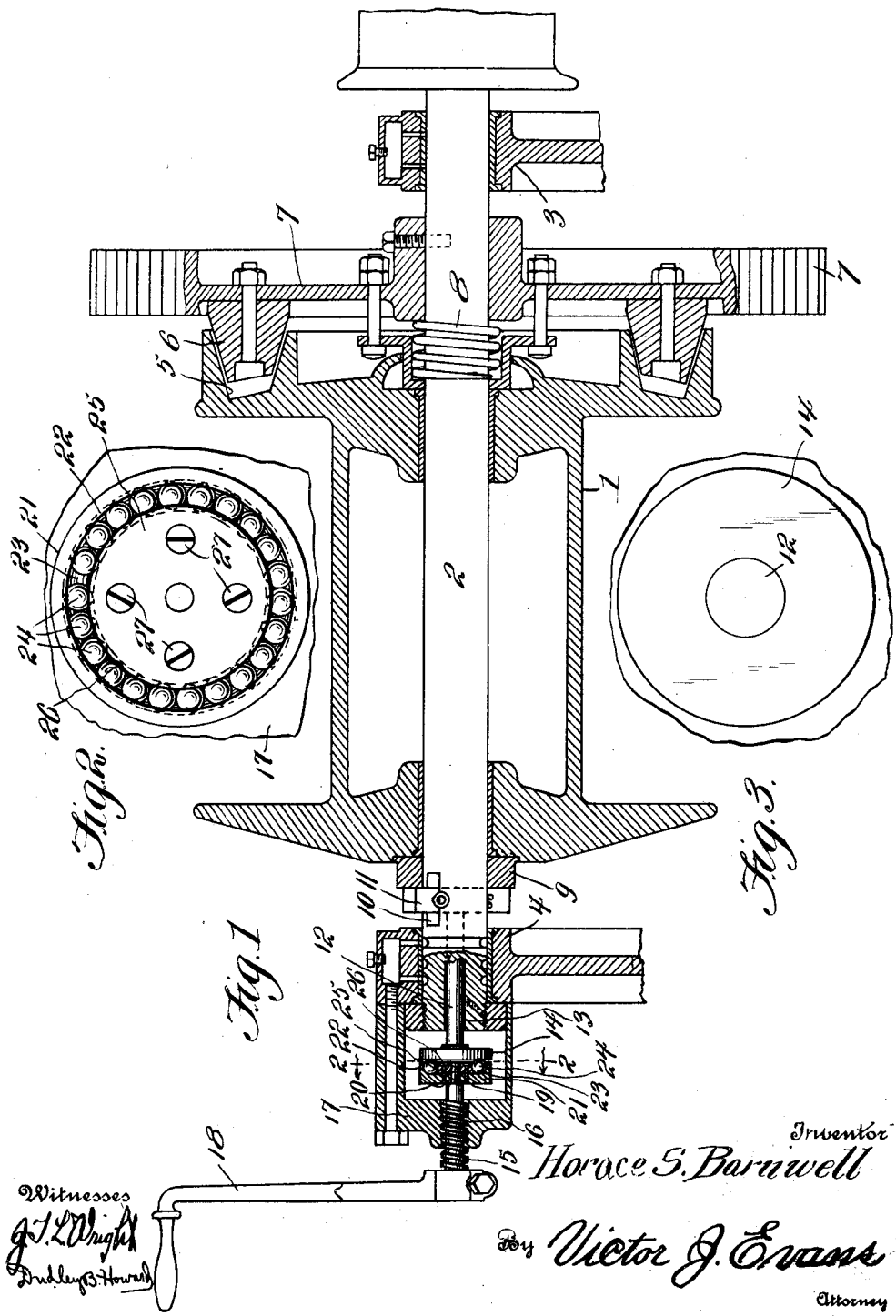

UNITED STATES PATENT OFFICE.

HORACE S. BARNWELL, OF SEATTLE, WASHINGTON.

CLUTCH-OPERATING MECHANISM.

1,108,669.  Specification of Letters Patent.  Patented Aug. 25, 1914.

Application filed March 18, 1913. Serial No. 755,183.

*To all whom it may concern:*

Be it known that I, HORACE S. BARNWELL, a citizen of the United States, residing at Seattle, in the county of King and State of Washington, have invented new and useful Improvements in Clutch-Operating Mechanisms, of which the following is a specification.

This invention relates to a device for operating the friction pin of the clutch mechanism ordinarily employed in hoisting drums and logging engines.

The primary object of the invention is to provide a device of this character which is adapted to be used in setting the friction pin with the least possible friction.

The invention consists in the features of construction, combination, and arrangement of parts, hereinafter fully described and claimed, reference being had to the accompanying drawing, in which:

Figure 1 is a longitudinal sectional view taken through the device as applied to the usual clutch mechanism of a hoisting engine; Fig. 2 is a transverse sectional view on line 2—2 of Fig. 1 looking in the direction of the arrow, and; Fig. 3 is a similar sectional view looking in the opposite direction.

In the drawing, the friction clutch mechanism of a hoisting engine is shown, wherein the numeral 1 designates the drum which is rotatably and slidably mounted upon the shaft 2 journaled in the bearings 3 and 4. The drum is provided with a clutch portion 5 adapted to be brought into engagement with the clutch member 6 provided upon the transmission gear 7, which latter is secured fixedly to the shaft 2, a helical spring 8 being mounted upon the said shaft in interposed relation to the drum 1 and the gear 7 so as to maintain the clutch mechanism normally inoperative. A friction collar 9 is mounted upon the shaft 2 against the opposite end of the drum for frictional engagement therewith, and the shaft at this point is provided with a longitudinal slot 10 having a cross key 11 slidably mounted therein for engagement with the collar 9. In this form of the clutch mechanism, a plurality of friction pins are usually mounted slidably within the longitudinal openings in the shaft for engagement with the cross key, further means being provided whereby the said friction pins may be moved inwardly to force the drum inwardly so as to render the clutch mechanism operative. In the use of this construction, there is a great deal of friction which heats the friction pins excessively, and often times causes expansion of the same to such a degree as to prevent proper operation thereof. I propose to overcome this objectionable feature by providing a single friction pin, such as is indicated by the numeral 12 and which is rotatably and slidably mounted within a central bore 13 provided in the shaft 2 in communication with the key slot 10. The inner end of this pin is engageable with the cross key 11, and a disk-shaped head 14 is provided upon the outer end thereof. The friction screw 15 which is adjustably mounted within the threaded opening 16 of the casing 17, is provided upon its outer end with a suitable operating crank 18, and has its inner end externally threaded as at 19 for reception within the threaded central opening 20 of a bearing head 21. The head 21 is provided with an annular flange 22 upon its inner end which is provided with an internal peripheral groove 23 forming a raceway for the reception of the antifriction balls 24, an annular retainer 25 being threaded onto the outwardly threaded end 19 of the friction screw and being provided with an exterior flange 26 for engagement with the balls 24 to retain the same in position within the race-way 23. This retainer is adapted to be secured against rotation, when in operative position, by means of the screws 27. The antifriction balls 24 are adapted to engage the head 14 provided upon the friction pin 12, so as to lessen the friction when the friction screw 15 is moved inwardly by the manual operation of the crank 18, in rendering the clutch mechanism operative against the tension of the spring 8.

In the operation of the device to render the clutch mechanism operative and thus to connect the hoisting drum with the shaft 2, assuming that the said shaft is rotating, the crank 18 is operated in counterclockwise direction so as to move the screw 15 inwardly. This movement of the screw will bring the anti-friction balls 24 of the bearing head 21 into engagement with the active face of the head 14 provided upon the friction pin 12. Further operation of the crank will cause the friction pin to be forced inwardly against the key 11, whereupon the drum 1 will be moved longitudinally upon the shaft 2 until connected operatively with the said shaft by means of the clutch mechanism. Owing to the fact that the key 11 is whirling rapidly with the shaft in which it is mounted, there will be considerable friction incident with the engagement of the friction pin therewith, which will cause the said pin to rotate with the shaft also. As the inner end of the friction pin is necessarily small in diameter, there would be a tendency for the pin to drill a hole in the key 11 unless this rotation of the friction pin were freely permitted. The provision of applicant's specific form of operating mechanism, wherein the engagement between the heads 21 and 14 is substantially frictionless, serves to permit free rotation of the friction pin with the shaft 2 and thus materially reduces the wear upon the cross key and the production of heat incident therewith, which would otherwise cause expansion of the friction pin both longitudinally and radially and cause binding of the friction pin within the shaft opening. When it is desired to disconnect the drum from the shaft, the crank 18 is operated reversely, that is in clockwise direction, whereupon the clutch mechanism will be rendered inoperative by the spring 8 and the friction pin 12 will become released from its engagement with the cross key as should be readily understood.

Having thus described my invention, what I claim is:

In a device of the class described, the combination with a shaft and clutch mechanism mounted thereon, the said shaft being provided with a longitudinal slot adjacent one end thereof and with a central bore in communication therewith, of a cross key slidably mounted within the shaft slot for engagement with the clutch mechanism, friction pin slidably and rotatably mounted within the shaft bore with its inner end frictionally engageable with the cross key, a head provided upon the outer end of said pin and having a flat end face, a casing, a longitudinally adjustable friction screw mounted within said casing, means by which said screw may be operated; a bearing head provided upon the inner end of said screw and provided with an annular race-way in its inner face, a plurality of anti-friction elements mounted within the said race-way for engagement with the end face of the head provided upon the friction pin, and means provided upon the bearing head for retaining the said balls within the race-way.

In testimony whereof I affix my signature in presence of two witnesses.

HORACE S. BARNWELL.

Witnesses:
SAMUEL JEWELL,
FRANK SEYKORA.